(12) United States Patent
Homma et al.

(10) Patent No.: US 10,170,776 B2
(45) Date of Patent: Jan. 1, 2019

(54) FUEL CELL MODULE

(71) Applicant: HONDA MOTOR CO., LTD., Tokyo (JP)

(72) Inventors: Hiroki Homma, Wako (JP); Keiji Tsukamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 15/254,498

(22) Filed: Sep. 1, 2016

(65) Prior Publication Data

US 2017/0069919 A1  Mar. 9, 2017

(30) Foreign Application Priority Data

Sep. 3, 2015 (JP) ................................. 2015-173415

(51) Int. Cl.
| | |
|---|---|
| *H01M 8/04* | (2016.01) |
| *H01M 8/04014* | (2016.01) |
| *H01M 8/0612* | (2016.01) |
| *H01M 8/0662* | (2016.01) |
| *H01M 8/2475* | (2016.01) |

(52) U.S. Cl.
CPC ..... *H01M 8/04022* (2013.01); *H01M 8/0625* (2013.01); *H01M 8/0662* (2013.01); *H01M 8/2475* (2013.01)

(58) Field of Classification Search
CPC .................................................... H01M 8/04
See application file for complete search history.

(56) References Cited

U.S. PATENT DOCUMENTS

| | | | | | |
|---|---|---|---|---|---|
| 3,959,018 | A | * | 5/1976 | Dunlop ................... | H01M 8/04 429/206 |
| 2009/0263689 | A1 | * | 10/2009 | Homma ............ | H01M 8/04022 429/411 |
| 2012/0121995 | A1 | * | 5/2012 | Grieve ................ | H01M 8/0618 429/410 |

FOREIGN PATENT DOCUMENTS

| | | |
|---|---|---|
| EP | 2 608 304 A1 | 6/2013 |
| JP | 2002-280053 A | 9/2002 |
| JP | 2004-207007 A | 7/2004 |
| JP | 2009-272117 A | 11/2009 |
| JP | 2009-277375 A | 11/2009 |
| JP | 2013-131329 A | 7/2013 |

OTHER PUBLICATIONS

Japanese Office Action dated May 30, 2017, issued in counterpart Japanese Patent Application No. 2015-173415 with English translation. (6 pages).

* cited by examiner

*Primary Examiner* — Jacob B Marks

(74) *Attorney, Agent, or Firm* — Westerman, Hattori, Daniels & Adrian, LLP

(57) ABSTRACT

A fuel cell module includes combustion gas channel members connected to a combustor and extending upward along the fuel cell stack. The combustion gas channel members have combustion gas channels, and combustion gas ejection holes. A combustion gas produced in the combustor flows through the combustion gas channels upward, and the combustion gas ejection holes are connected to the combustion gas channels for releasing the combustion gas toward side surfaces of the fuel cell stack.

9 Claims, 5 Drawing Sheets

FUEL CELL MODULE

CROSS-REFERENCE TO RELATED APPLICATION

This application is based upon and claims the benefit of priority from Japanese Patent Application No. 2015-173415 filed on Sep. 3, 2015, the contents of which are incorporated herein by reference.

BACKGROUND OF THE INVENTION

Field of the Invention

The present invention relates to a fuel cell module including a fuel cell stack provided with a plurality of fuel cells for generating electrical energy by electrochemical reactions of a fuel gas and an oxygen-containing gas.

Description of the Related Art

In general, a solid oxide fuel cell (SOFC) employs a solid electrolyte. The solid electrolyte is an oxide ion conductor such as stabilized zirconia. The solid electrolyte is interposed between an anode and a cathode to form an electrolyte electrode assembly (MEA). The electrolyte electrode assembly is sandwiched between separators (bipolar plates). In use, generally, predetermined numbers of the electrolyte electrode assemblies and the separators are stacked together to form a fuel cell stack.

In comparison with the other types of fuel cells, the operating temperature of SOFC is relatively high. Therefore, it is required to maintain the SOFC at high temperature (suitable operating temperature). To this end, various proposals have been made so far.

For example, a fuel cell power generation system disclosed in Japanese Laid-open Patent Publication No. 2002-280053 is known. In this fuel cell power generation system, a plurality of solid oxide fuel cells each having a cylindrical shape with a bottom are placed in a power-generation reaction chamber. An exhaust air chamber divided by partition walls is formed at an upper position of the power generation reaction chamber, and a fuel gas chamber is formed at a lower central position of the power generation reaction chamber. At the lower position of the power generation reaction chamber, a surface combustion burner is provided around the fuel gas chamber. A heat insulating layer surrounds the power generation reaction chamber, an exhaust air chamber, and a fuel gas chamber. Further, a module container is provided around the heat insulating layer.

Further, a fuel cell apparatus disclosed in Japanese Laid-Open Patent Publication No. 2013-131329 is known. The fuel cell apparatus has a power generation chamber including a fuel cell stack accommodated at the center inside the casing. The power generation chamber is partitioned by a highly heat insulating layer, and an exhaust gas channel is provided outside of the heat insulating layer for discharging the exhaust gas produced in the power generation chamber to the outside. Further, a cathode gas channel is provided outside of the exhaust gas channel for supplying the cathode gas to the cathode of the fuel cell stack.

SUMMARY OF THE INVENTION

In Japanese Laid-Open Patent Publication No. 2002-280053, combustion is performed by operating the surface combustion burner provided at the lower position of the power generation reaction chamber. Thus, the fuel cells in the power generation reaction chamber are heated by the radiation heat. However, since the fuel cell is heated only by the radiation heat from the lower position, it is not possible to uniformly heat the entire fuel cells in the vertical direction.

Further, in Japanese Laid-Open Patent Publication No. 2013-131329, the heat insulating layer, the exhaust gas channel, and the cathode gas channel are provided in the casing around the power generation chamber at the center. Therefore, the casing has a significantly large diameter as a whole, and it is not possible to uniformly heat the entire fuel cell stack provided in the power generation chamber.

A main object of the present invention is to provide a fuel cell module having compact and simple structure.

Another object of the present invention is to provide a fuel cell module in which it is possible to uniformly heat the entire fuel cell stack.

The fuel cell module according to the present invention includes the fuel cell stack and the combustor. The fuel cell stack includes a plurality of fuel cells configured to generate electrical energy by electrochemical reactions of a fuel gas and an oxygen-containing gas. A combustor is provided at a lower end of the fuel cell stack, and configured to produce a combustion gas so as to heat the fuel cell stack.

The fuel cell module includes a channel member connected to the combustor, and extending upward along a side surface of the fuel cell stack. The channel member includes a combustion gas channel configured to allow the combustion gas produced in the combustor to flow upward, and a combustion gas ejection hole connected to the combustion gas channel and configured to release the combustion gas toward the side surface of the fuel cell stack.

Further, preferably, the fuel cell stack is a flat plate stack type fuel cell including the fuel cells of a flat type stacked in a vertical direction. In this case, preferably, end plates configured to fix the fuel cells are provided at an upper end and a lower end of the fuel cell stack, respectively, and an upper combustion gas ejection port is provided at an upper position of the channel member and is configured to release the combustion gas toward an area above the fuel cell stack.

The end plate provided at the lower end of the fuel cell stack is heated by combustion neat from the combustion chamber, and the end plate provided at the upper end of the fuel cell stack is heated by the combustion gas ejected from the upper combustion gas ejection port. Conventionally, though the temperatures of the fuel cells in the vicinity of the end plates (at both ends) tend to be low, excessive decrease in the temperatures of the fuel cells does not occur in the present invention. Accordingly, it is possible to maintain the desired power generation performance of the fuel cells.

Further, the fuel cell module preferably includes a casing at least containing the fuel cell stack, the combustor, and the channel member, and the casing includes a hermetically closed upper end. In the structure, it becomes possible to reliably supply the combustion gas released into the casing to the area above the fuel cell stack, and efficiently utilize the combustion heat of the combustion gas.

Further, in the casing, preferably, the casing includes a combustion gas discharge port configured to discharge the combustion gas released from the channel member to outside of the casing, and the combustion gas discharge port is provided at a lower position of the casing. In the structure, it is possible to extend the period of time for which the combustion gas stays in the casing, and reliably heat the fuel cell stack.

Further, preferably, the casing comprises a plurality of panels. Among the plurality of panels, one panel includes an oxygen-containing gas intake port configured to take the oxygen-containing gas from outside to inside of the casing. Another panel positioned opposite to the one panel includes an oxygen-containing gas supply port configured to supply the oxygen-containing gas to the fuel cell stack.

In the structure, preferably, an oxygen-containing gas supply channel is formed inside the plurality of panels, is configured to supply the oxygen-containing gas taken through the oxygen-containing gas intake port, from the oxygen-containing gas supply port to the fuel cell stack, and is configured to receive heat from the combustion gas to heat the oxygen-containing gas.

In the structure, the flow field of the oxygen-containing gas supply channel becomes long, and if becomes possible to reliably heat the oxygen-containing gas by heat exchange with the combustion gas. Further, no special heat exchanger is required for heating the oxygen-containing gas. Further, it is possible to suitably suppress radiation of the heat from the fuel cell module.

Further, preferably, a fuel exhaust gas and an oxygen-containing exhaust gas discharged from the fuel cell stack are supplied to the combustor. In the structure, the combustor can have both of the functions as a start-up combustor and as an off gas combustor during steady operation.

Moreover, preferably, the combustor includes a combustion chamber, and both ends of the combustion chamber are opened. In the structure, preferably, the channel member includes a hollow rectangular first casing member and a hollow rectangular second casing member. The first casing member is connected to one end of the combustion chamber and extends upward along one side surface of the fuel cell stack. The second casing member is connected to another end of the combustion chamber and extends upward along another side surface of the fuel cell stack.

Therefore, the combustion gas produced by the combustor can be utilized efficiently as a heat source for heating the fuel cell stack, and it becomes possible to start operation of the fuel cell stack promptly.

Further, preferably, a reformer is provided at a bottom of the combustor and configured to reform a raw fuel chiefly containing hydrocarbon so as to produce the fuel gas supplied to the fuel cell stack. In the structure, the reformer can be heated easily by the heat from the combustor, and improvement in the heat efficiency is achieved.

In the present invention, the fuel cell stack is heated by the heat from the combustor from a lower end to an upper end, and the fuel cell stack is heated from the side surfaces by the combustion gas released from the combustion gas ejection holes. Therefore, the fuel cell stack is heated from its lower end and side surfaces. Thus, with the compact and simple structure, it becomes possible to heat, the entire fuel cell stack uniformly and promptly.

The above and other objects, features and advantages of the present, invention will become more apparent, from the following description when taken in conjunction with the accompanying drawings in which a preferred embodiment, of the present invention is shown by way of illustrative example.

DESCRIPTION OF THE PREFERRED EMBODIMENTS

Figure 1:
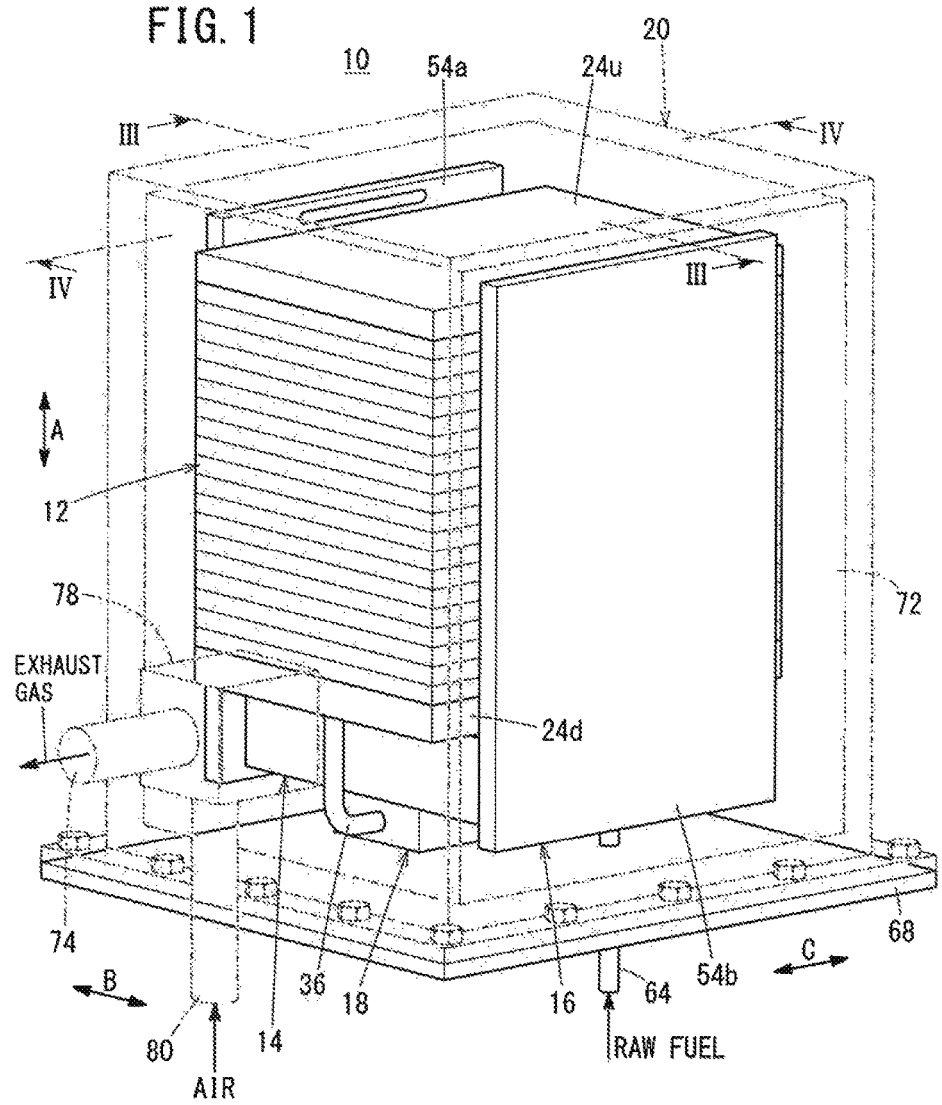
FIG. 1 is a perspective view schematically showing a fuel cell module according to an embodiment of the present invention.
Figure 2:
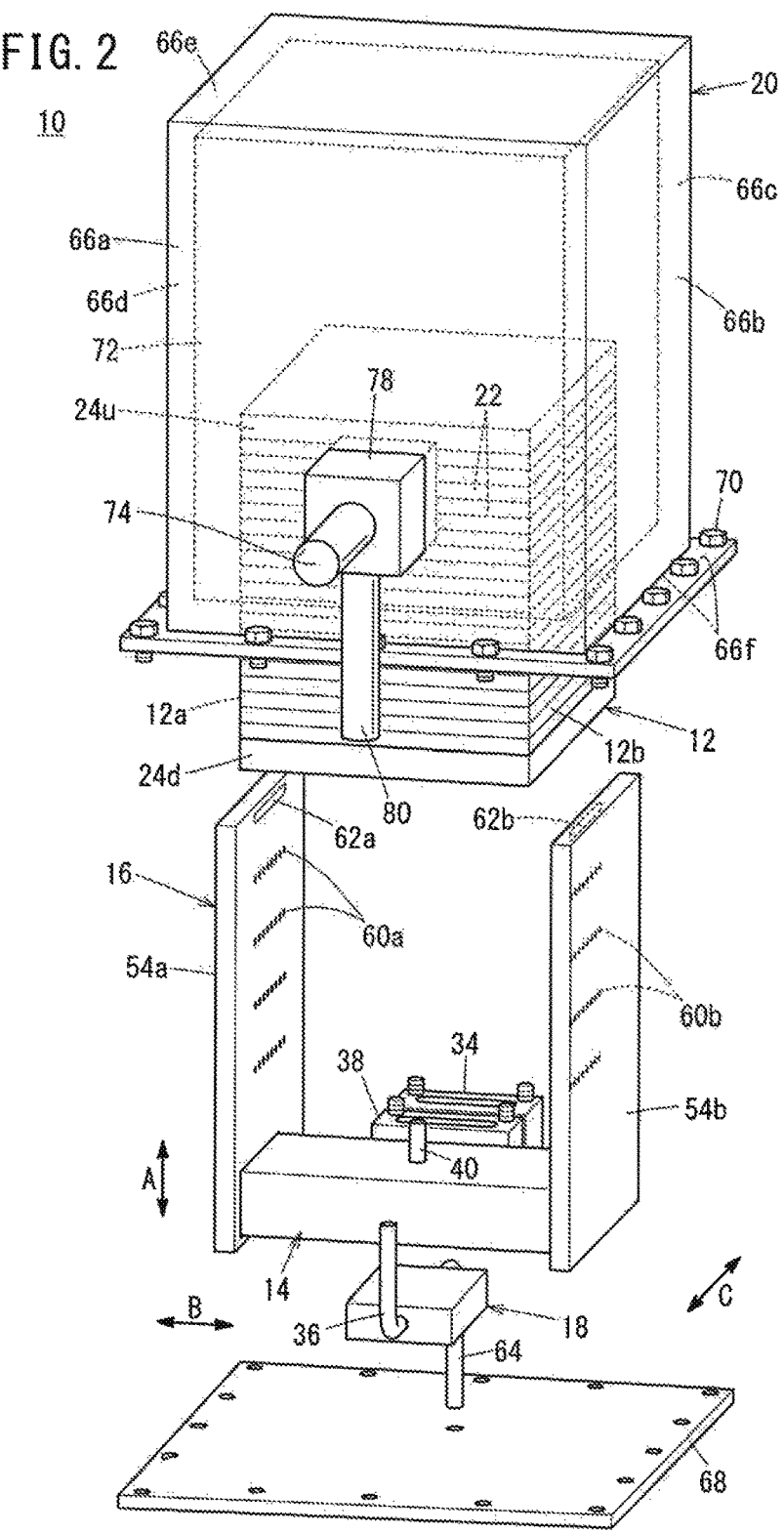
FIG. 2 is an exploded perspective view showing main components of the fuel cell module.

A fuel cell module 10 according to an embodiment of the present invention shown in FIGS. 1 and 2 is used in various applications, including stationary and mobile applications. For example, the fuel cell module 10 is mounted on a vehicle. The fuel cell module 10 includes a fuel cell stack 12, a combustor 14, combustion gas channel members 16, and a reformer 18, and a casing 20 containing the fuel cell stack 12, the combustor 14, the combustion gas channel member 16, and the reformer 18. Although the fuel cell stack 12 has a rectangular shape in the illustrated embodiment, the fuel cell stack 12 may have a square shape.

Figure 3:
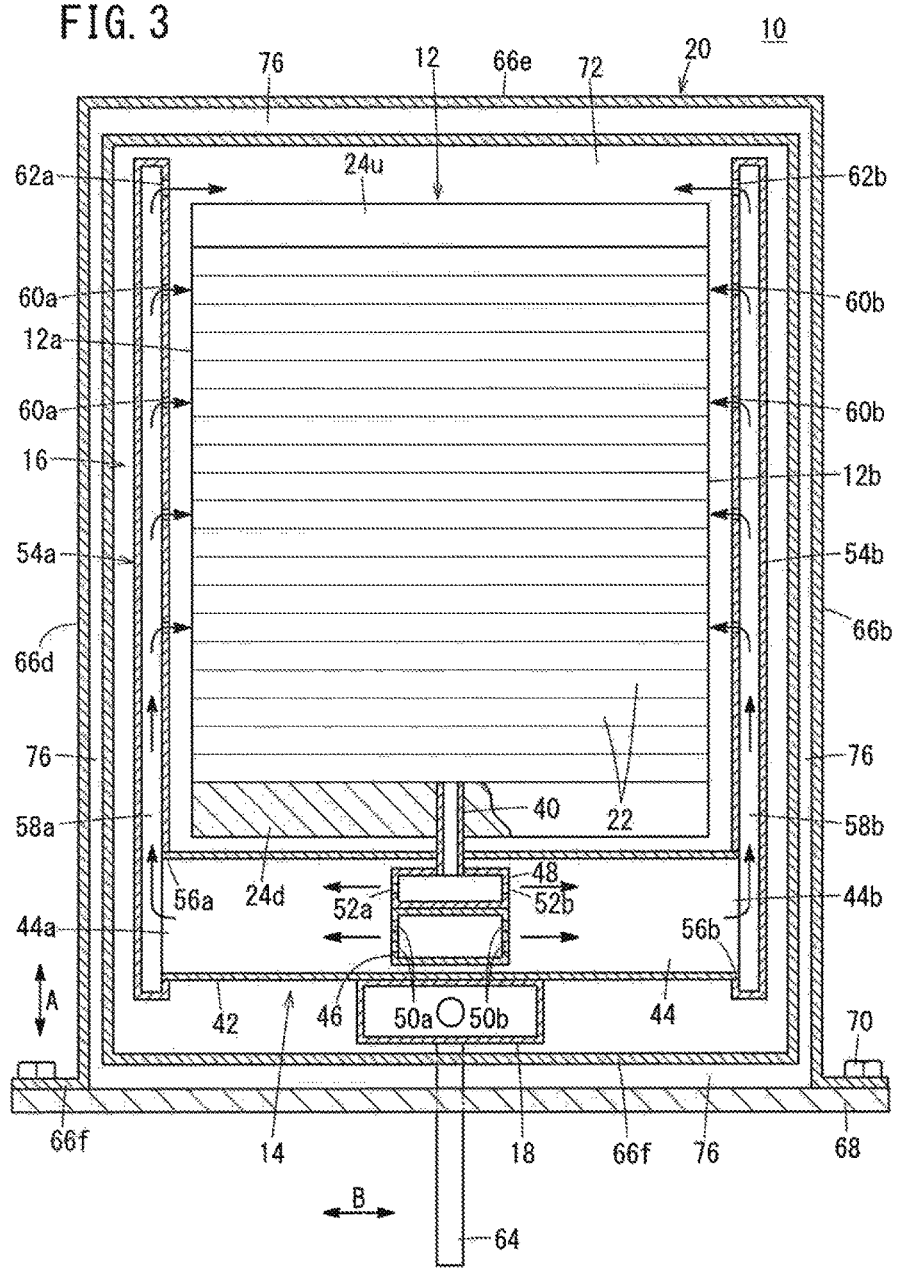
FIG. 3 is a cross sectional view showing the fuel cell module taken along a line III-III in FIG. 1.
Figure 4:
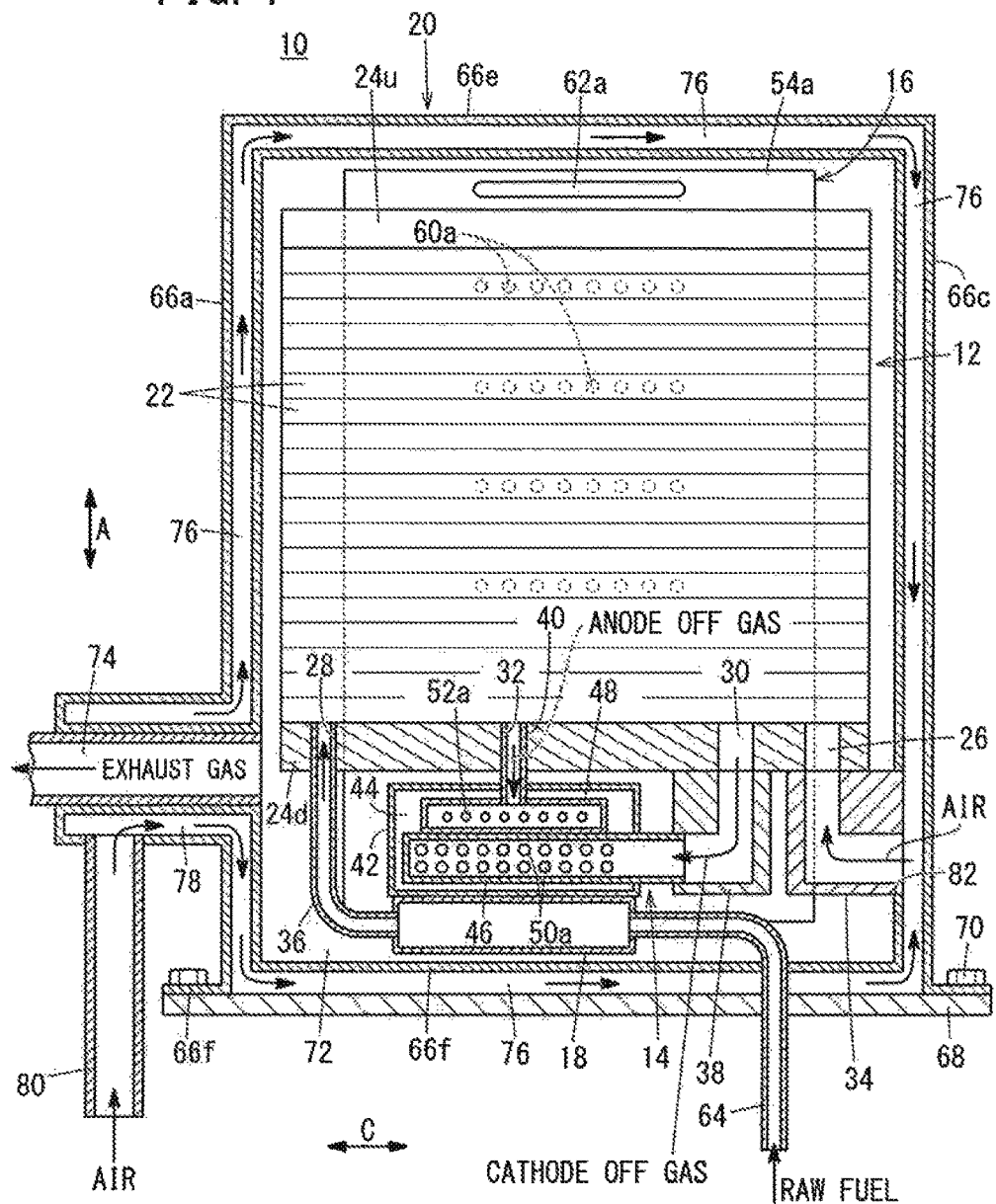
FIG. 4 is a cross sectional view taken along a line IV-IV in FIG. 1.

As shown in FIGS. 3 and 4, the fuel cell stack 12 includes a plurality of fuel cells 22 for generating electrical energy by electrochemical reactions of a fuel gas (mixed gas of a hydrogen gas with methane and carbon monoxide) and the oxygen-containing gas (air). Each of the fuel cells 22 is a flat plate type solid oxide fuel cell. The fuel cells 22 are stacked together in a vertical direction indicated by an arrow A to form a flat plate stack type fuel cell stack.

The fuel cell 22 includes an electrolyte electrode assembly (MEA). The electrolyte electrode assembly includes a cathode, an anode, and an electrolyte interposed between the cathode and the anode. For example, the electrolyte is an oxide ion conductor such as stabilized zirconia. A cathode separator and an anode separator are provided on both surfaces of the electrolyte electrode assembly. An oxygen-containing gas flow field for supplying an oxygen-containing gas to a cathode is formed in the cathode separator, and a fuel gas flow field for supplying a fuel gas to an anode is formed in the anode separator.

The fuel cell stack 12 includes an upper end plate 24*u* and a lower end plate 24*d* at both ends, i.e., at upper and lower ends of in the stacking direction of the fuel cells 22. The upper end plate 24*u* and the lower end plate 24*d* press the fuel cells 22 in the stacking direction in a manner that the fuel cells 22 are fixed together.

As shown in FIG. 4, the lower end plate 24*d* has an oxygen-containing gas inlet port 26 for supplying the oxygen-containing gas to each of the fuel cells 22, and a fuel gas inlet port 28 for supplying the fuel gas to each of the fuel cells 22.

The lower end plate 24*d* has an oxygen-containing gas outlet port 30 for discharging the oxygen-containing gas supplied to and partially consumed at the cathode (hereinafter also referred to as the oxygen-containing discharge gas) or discharging the oxygen-containing gas which has passed the cathode before starting operation of the fuel cell stack 12. Further, the lower end plate 24*d* has a fuel gas outlet port 32 for discharging the fuel gas supplied to and partially consumed at the anode (hereinafter also referred to as the fuel exhaust gas) or discharging the fuel gas which has passed the anode before starting operation of the fuel cell stack 12.

One end (outlet) of an oxygen-containing gas supply member (oxygen-containing gas supply port) 34 is connected to the oxygen-containing gas inlet port 26, and another end (inlet) of the oxygen-containing gas supply member 34 is connected to the casing 20 as described later. One end (outlet) of a reformed gas supply pipe 36 is connected to the fuel gas inlet port 28, and another end (inlet) of the reformed gas supply pipe 36 is connected to an outlet of the reformer 18 described later.

One end of an oxygen-containing gas discharge member 38 is connected to the oxygen-containing gas outlet port 30, and another end of the oxygen-containing gas discharge member 38 is connected to the combustor 14. One end of a fuel gas discharge pipe 40 is connected to the fuel gas outlet port 32, and another end of the fuel gas discharge pipe 40 is connected to the combustor 14.

Figure 5:
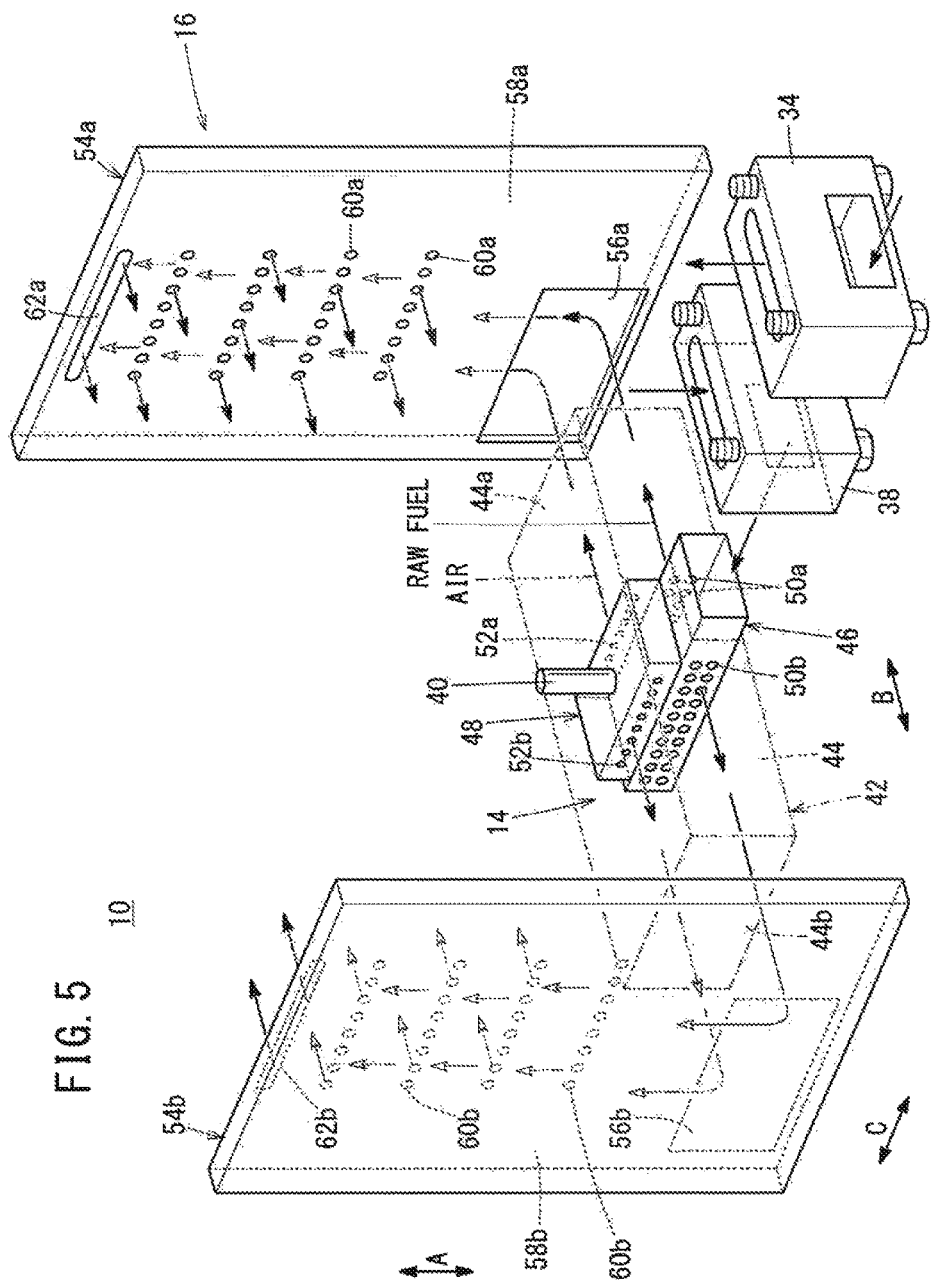
FIG. 5 is an exploded perspective view showing main components of the fuel cell module.

The combustor 14 is provided at a lower end (bottom surface) of the fuel cell stack 12, and includes a combustor casing 42 extending along the lower end in a horizontal direction indicated by an arrow B. A combustion chamber 44 is formed in the combustor casing 42. As shown in FIG. 5, ends 44a, 44b of the combustor chamber 44 in the direction by the arrow B are opened. In the combustion chamber 44, an oxygen-containing gas casing 46 and a fuel gas casing 48 are provided at the center in the direction indicated by the arrow B. The oxygen-containing gas casing 46 and the fuel gas casing 48 are stacked in the vertical direction indicated by the arrow A.

As shown in FIGS. 4 and 5, one end of the oxygen-containing gas casing 46 provided under the fuel gas casing 48 protrudes to the outside of the combustor casing 42. The other end of the oxygen-containing gas discharge member 38 is connected to the one end of the oxygen-containing gas casing 46. The oxygen-containing gas casing 46 extends in a longitudinal direction of the fuel cell stack 12 indicated by an arrow C (in a horizontal direction perpendicular to the direction indicated by the arrow B), and a plurality of holes 50a, 50b are formed in both of elongated side surfaces (both of vertical surfaces) of the oxygen-containing gas casing 46. The holes 50a, 50b are opened to the combustion chamber 44.

The fuel gas casing 48 provided on the upper side of the oxygen-containing gas casing 46 is in the form of a thin plate. The fuel gas casing 48 is smaller than the oxygen-containing gas casing 46. The other end of the fuel gas discharge pipe 40 is connected to a substantially central position of the upper surface of the oxygen-containing gas casing 46. A plurality of holes 52a, 52b are formed in both of elongated side surfaces (both vertical surfaces) of the fuel gas casing 48. The holes 52a, 52b are opened to the combustion chamber 44.

As shown in FIGS. 2 and 3, the combustion gas channel members 16 extend upward along side surfaces 12a, 12b of long sides of the fuel cell stack 12. The combustion gas channel members 16 include a hollow rectangular first casing member 54a and a hollow rectangular second casing member 54b. Upper ends of the first casing member 54a and the second casing member 54b are positioned above the upper end of the fuel cell stack 12 (see FIG. 3).

As shown in FIGS. 3 and 5, an opening 56a is formed at a lower position of the first casing member 54a. The opening 56a is connected to one end 44a of the combustor casing 42. The opening 56a is formed in the first casing member 54a. The opening 56a is connected to a combustion gas channel 58a for allowing the combustion gas to flow upward.

A plurality of combustion gas ejection holes 60a are arranged in a plurality of vertical rows above a substantially central height position of the first casing member 54a. The combustion gas is released through the combustion gas ejection holes 60a toward the one side surface 12a of the fuel cell stack 12. An upper combustion gas ejection port 62a is formed at an upper position of the first casing member 54a. The combustion gas is released through the upper combustion gas ejection port 62a toward an area above the fuel cell stack 12. The upper combustion gas ejection port 62a has a laterally elongated slit shape, and is opened to a position above the upper surface of the fuel cell stack 12 (see FIGS. 3 and 4).

As shown in FIG. 5, an opening 56b is formed at a lower position of the second casing member 54b. The opening 56b is connected to the other end 44b of the combustor casing 42. The opening 56b is formed in the second casing member 54b. The opening 56b is connected to a combustion gas channel 58b for allowing the combustion gas to flow upward.

A plurality of combustion gas ejection holes 60b are arranged in a plurality of vertical rows above a substantially central height position of the second casing member 54b. The combustion gas is released through the combustion gas ejection holes 60b toward the other side surface 12b of the fuel cell stack 12. An upper combustion gas ejection port 62b is formed at an upper position of the second casing member 54b. The combustion gas is released through the upper combustion gas ejection port 62b toward an area above the fuel cell stack 12. The upper combustion gas ejection port 62b has a laterally elongated slit shape, and is opened to a position above the upper surface of the fuel cell stack 12.

The reformer 18 reforms a raw fuel chiefly containing hydrocarbon (for example, reforms a mixed gas of the city gas 13A and water vapor by steam reforming) to produce the fuel gas supplied to the fuel cell stack 12. One end of a raw fuel supply pipe 64 is connected to an inlet of the reformer 18, and another end the raw fuel supply pipe 64 is connected to a raw fuel supply source (not shown). The other end of the reformed gas supply pipe 36 is connected to an outlet of the reformer 18.

As shown in FIG. 2, the casing 20 includes a plurality of, e.g., six panels 66a to 66f. The panels 66a to 66f are joined together, and fixed to a bottom plate 68 using a plurality of screws 70. The combustor 14, the combustion gas channel member 16, and the reformer 18 are placed in the casing 20. Further, a combustion gas chamber 72 is formed in the casing 20. A combustion gas is filled in the combustion gas chamber 72. The combustion gas chamber 72 is opened to the outside through a combustion gas discharge port 74 provided at a lower position (a lower end or a position adjacent to the lower end) of the panel 66a for discharging the combustion gas to the outside of the casing 20. At least an upper end (panel 66e) of the casing 20 is hermetically closed.

As shown in FIGS. 3 and 4, each of the panels 66a to 66f has hollow structure, and an oxygen-containing gas supply channel 76 is formed in the panels 66a to 66f as a passage of the oxygen-containing gas before the oxen-containing gas is supplied to the fuel cell stack 12. The panel 66a (one panel) has an oxygen-containing gas intake port 78 for taking the oxygen-containing gas from the outside to the inside of the casing 20. A lower part of the panel 66a is partially expanded in an annular shape to form the oxygen-containing gas intake port 78 in a dual tube. The combustion gas discharge port 14 is formed inside the dual tube to expose the casing 20 to the outside. An oxygen-containing gas supply pipe 80 that extends in the vertical direction is connected to the oxygen-containing gas intake port 78.

An oxygen-containing gas supply port 82 is provided in another panel 66c positioned opposite to the panel 66a, for supplying the oxygen-containing gas to the fuel cell stack 12. After the oxygen-containing gas flows into the oxygen-containing gas intake port 78, the oxygen-containing gas is supplied from the oxygen-containing gas supply port 82 to the fuel cell stack 12 through the oxygen-containing gas supply channel 76. Further, the oxygen-containing gas supply channel 76 has a function as a heat exchanger for receiving heat from the combustion gas to heat the oxygen-containing gas. The other end of the oxygen-containing gas supply member 34 is connected to the oxygen-containing gas supply port 82.

Operation of the fuel cell module 10 having the above structure will be described below.

At the time of starting operation of the fuel cell module 10, as shown in FIGS. 1 and 4, air taken from the oxygen-containing gas supply pipe 80 to the oxygen-containing gas intake port 78 is supplied into the oxygen-containing gas supply channel 76 formed by the dual tube structure of the casing 20. As shown in FIG. 4, after the air flows along the oxygen-containing gas supply channel 76, the oxygen-containing gas flows from the oxygen-containing gas supply port 82 through the oxygen-containing gas supply member 34, and then, the oxygen-containing gas is supplied into the oxygen-containing gas inlet port 26 of the lower end plate 24$d$.

The air flows inside each of the fuel cells 22. The air flows from the oxygen-containing gas outlet port 30 through the oxygen-containing gas discharge member 38, and flows into the oxygen-containing gas casing 46 of the combustor 14. Further, the air flows through the holes 50$a$ and the holes 50$b$, and then, the air is supplied to the combustion chamber 44 of the combustor casing 42.

In the meanwhile, a raw fuel such as the city gas (containing $CH_4$, $C_2H_6$, $C_3H_8$, $C_4H_{10}$) is supplied from the raw fuel supply pipe 64 to the reformer 18. The raw fuel may contain water (water vapor) for reforming reaction. The raw fuel flows through the reformed gas supply pipe 36, and the raw fuel is supplied to the fuel gas inlet port 28 of the lower end plate 24$d$.

The raw fuel flows inside each of the fuel cells 22. The raw fuel flows from the fuel gas outlet port 32 through the fuel gas discharge pipe 40, and flows into the fuel gas casing 48 of the combustor 14. Further, the raw fuel flows through the holes 52$a$ and the holes 52$b$, and then, the raw fuel is supplied into the combustion chamber 44 of the combustor casing 42.

Thus, as shown in FIG. 5, the air and the raw fuel are mixedly present in the combustion chamber 44. By turning on a glow plug (not shown) or the like, ignition occurs, and combustion is started. The combustion gas produced by combustion flows from the ends 44$a$, 44$b$ on both sides of the combustion chamber 44 into the combustion gas channel 58$a$ of the first casing member 54$a$ and the combustion gas channel 58$b$ of the second casing member 54$b$.

The combustion gas flows upward along the combustion gas channels 58$a$, 58$b$, and the combustion gas is partially released from the combustion gas ejection holes 60$a$ and the combustion gas ejection holes 60$b$ toward the side surfaces 12$a$, 12$b$ of the fuel cell stack 12. The remaining combustion gas is released from the upper combustion gas ejection ports 62$a$, 62$b$ connected to the upper positions of the combustion gas channels 58$a$, 58$b$, toward the area above the fuel cell stack 12. Therefore, the fuel cell stack 12 is heated from the side surfaces 12$a$, 12$b$ and the upper side.

The combustor 14 is provided below the fuel cell stack 12. Therefore, by radiation of the heat from the combustor 14, the fuel cell stack 12 is heated from the lower side. Further, since the combustion gas chamber 72 in the casing 20 is filled with the combustion gas, in the oxygen-containing gas supply channel 76 surrounding the combustion gas chamber 72, the oxygen-containing gas is heated by the combustion gas.

The combustion gas filled in the combustion gas chamber 72 is discharged from the combustion gas discharge port 74 formed at the lower position of the panel 66$a$ to the outside, and heats the air supplied from the oxygen-containing gas supply pipe 80 to the oxygen-containing gas intake port 78.

Further, the reformer 18 is provided at the lower position of the combustor 14, and the reformer 18 is heated by the heat radiated from the combustor 14, and combustion gas of the combustion gas chamber 72. Therefore, by reforming reaction of the raw fuel supplied to the reformer 18 (e.g., reaction of steam reforming), hydrocarbon of $C_{2+}$ is removed (reformed), and a reformed gas (fuel gas) chiefly containing methane is obtained.

The reformed gas is supplied to fuel gas channels of each fuel cell 22. The air is supplied to oxygen-containing gas channels of each fuel cell 22. As described above, the reformed gas and the air are heated by the combustion gas, and directly heat each fuel cell 22.

When the fuel cell stack 12 is heated to a temperature suitable for operation (power generation temperature), power generation by the fuel cell stack 12 is started. That is, in each fuel cell 22, power generation is performed by chemical reactions of the reformed gas and the air. As shown in FIG. 4, by power generation reactions, the air is discharged from the fuel cell stack 12 as an oxygen-containing exhaust gas. The oxygen-containing exhaust gas flows from the oxygen-containing gas outlet port 30 to the oxygen-containing gas discharge member 38, and flows into the oxygen-containing gas casing 46 of the combustor 14. Further, the oxygen-containing exhaust gas flows through the holes 50$a$ and the holes 50$b$, and the oxygen-containing exhaust gas is supplied to the combustion chamber 44 of the combustor casing 12.

The fuel gas is discharged from the fuel cell stack 12 as a fuel exhaust gas. The fuel exhaust gas flows from the fuel gas outlet port 32 through the fuel gas discharge pipe 40, and the fuel exhaust gas flows in the fuel gas casing 48 of the combustor 14. Further, the fuel exhaust gas flows through the holes 52$a$ and the holes 52$b$, and the fuel exhaust gas is supplied to the combustion chamber 44 of the combustor casing 42.

Thus, in the combustion chamber 44, the fuel exhaust gas and the oxygen-containing exhaust gas are mixed together, and combusted to produce a combustion exhaust gas. This combustion exhaust gas flows into the combustion gas channel 58$a$ of the first casing member 54$a$ and the combustion gas channel 58$b$ of the second casing member 54$b$.

In the embodiment of the present invention, the fuel cell module 10 has the combustion gas channel members 16. The combustion gas channel members 16 are connected to the combustor 14, and extend upward along the side surfaces 12$a$, 12$b$ on the long sides of the fuel cell stack 12. The combustion gas channel members 16 have combustion gas channels 58$a$, 58$b$ and combustion gas ejection holes 60$a$, 60$b$. The combustion gas produced in the combustor 14 flows upward through the combustion gas channels 58$a$, 58$b$. The combustion gas ejection holes 60$a$, 60$b$ are connected to the combustion gas channels 58$a$, 58$b$, and release the combustion gas toward the side surfaces 12$a$, 12$b$ of the fuel cell stack 12.

In the structure, by the heat from the combustor 14, the fuel cell stack 12 is heated from the lower end to the upper end, and by the combustion gas released from the combustion gas ejection holes 60$a$, 60$b$, the fuel cell stack 12 is heated from the side surfaces 12a, 12b. Therefore, the fuel cell stack 12 is heated from its lower end and side surfaces 12a, 12b. Thus, with the compact and simple structure, it becomes possible to heat the entire fuel cell stack 12 uniformly and promptly.

Further, the fuel cell stack 12 is a flat plate stack type fuel cell stack formed by stacking a plurality of fuel cells 22 of a flat plate type in the vertical direction. In this regard, the upper end plate 24u and the lower end plate 24d are provided at the upper end and the lower end of the fuel cell stack 12 for fixing the fuel cells 22. Further, the upper combustion gas ejection ports 62a, 62b are provided at the upper positions of the combustion gas channel members 16 for releasing the combustion gas toward the area above the fuel cell stack 12.

The lower end plate 24d provided at the lower end of the fuel cell stack 12 is heated by the combustion heat from the combustor 14. The upper end plate 24u provided at the upper end of the fuel cell stack 12 is heated by the combustion gas ejected from the upper combustion gas ejection ports 62a, 62b. Therefore, though the temperatures of the fuel cells 22 at the upper end plate 24u and the lower end plate 24d tend to be low, excessive decrease in the temperatures of the fuel cells 22 does not occur. Accordingly, it is possible to maintain the desired power generation performance of the fuel cells 22.

Further, the fuel cell module 10 includes the casing 20 at least containing the fuel cell stack 12, the combustor 14, and the combustion gas channel members 16. The upper end of the casing 20 is hermetically closed. In the structure, it becomes possible to reliably supply the combustion gas released into the casing 20 to the upper position of the fuel cell stack 12, and efficiently utilize the combustion neat of the combustion gas.

Furthermore, as shown in FIG. 4, the casing 20 has the combustion gas discharge port 74 for discharging the combustion gas released from the combustion gas channel members 16 to the outside of the casing 20. The combustion gas discharge port 74 is provided at the lower position of the casing 20. Therefore, it is possible to extend the period of time for which the combustion gas stays in the casing 20, and reliably heat the fuel cell stack 12. The combustion gas discharge port 74 may be provided at the lower end of the casing 20, or provided at a position spaced upward from the lower end by a predetermined distance.

Further, the casing 20 comprises a plurality of, e.g., the six panels 66a to 66f. In this regard, the panel 66a (one panel) has the oxygen-containing gas intake port 78 for taking the oxygen-containing gas from the outside to the inside of the casing 20. The other panel 66c positioned opposite to the panel 66a has the oxygen-containing gas supply port 82 for supplying the oxygen-containing gas to the fuel cell stack 12.

As shown in FIGS. 3 and 4, each of the panels 66a to 66f has a hollow shape, and the oxygen-containing gas supply channel 76 is formed in the panels 66a to 66f. Thus, after the oxygen-containing gas flows into the oxygen-containing gas intake port 78, through the oxygen-containing gas supply channel 76, the oxygen-containing gas is supplied from the oxygen-containing gas supply port 82 to the fuel cell stack 12. Further, the oxygen-containing gas supply channel 76 receives the heat from the combustion gas to heat the oxygen-containing gas.

Thus, the flow field of the oxygen-containing gas supply channel 76 becomes long, and it becomes possible to reliably heat the oxygen-containing gas by heat exchange with the combustion gas. Further, no special heat exchanger is required for heating the oxygen-containing gas. Moreover, it is possible to suitably suppress heat radiation from the fuel cell module 10.

Further, the fuel exhaust gas and the oxygen-containing exhaust gas discharged from the fuel cell stack 12 are supplied to the combustor 14. In the structure, the combustor 14 can have both of the function as a start-up combustor and the function as an off gas combustor during steady operation.

Furthermore, the combustor 14 has the combustion chamber 44 having both ends 44a, 44b opened as shown in FIGS. 3 and 5. In this regard, the combustion gas channel members 16 include the hollow rectangular first casing member 54a and the hollow rectangular second casing member 54b. The first casing member 54a is connected to the one end 44a of the combustion chamber 44, and extends upward along the one side surface 12a of the fuel cell stack 12. The second casing member 54b is connected to the other end 44b of the combustion chamber 44, and extends upward along the other side surface 12b of the fuel cell stack 12.

Therefore, the combustion gas produced by the combustor 14 can be utilized efficiently as a heat source for heating the fuel cell stack 12, and if becomes possible to start operation of the fuel cell stack 12 promptly.

Further, the reformer 18 is provided at the bottom of the combustor 14 for reforming the raw fuel chiefly containing hydrocarbon, and producing the fuel gas supplied to the fuel cell stack 12. In the structure, the reformer 18 can be heated easily by the heat from the combustor 14, and improvement in the heat efficiency is achieved.

While the invention has been particularly shown and described with reference to a preferred embodiment, if will be understood that variations and modifications can be effected thereto by those skilled in the art without departing from the scope of the invention as defined by the appended claims.

What is claimed is:
1. A fuel cell module comprising:
a fuel cell stack including a plurality of fuel cells stacked in a vertical direction configured to generate electrical energy by electrochemical reactions of a fuel gas and an oxygen-containing gas;
a combustor provided at a lower end of the fuel cell stack, and configured to produce a combustion gas so as to heat the fuel cell stack;
a channel member connected to the combustor, extending upward along the stacking direction of the fuel cell stack, and facing a side surface of the fuel cell stack, the side surface being perpendicular to the stacking direction;
wherein the channel member includes a combustion gas channel configured to allow the combustion gas produced in the combustor to flow upward along the stacking direction of the fuel cell stack; and
a combustion gas ejection hole that is connected to the combustion gas channel, opens toward a direction perpendicular to the stacking direction of the fuel cell stack, and is configured to release, toward the side surface of the fuel cell stack, part of the combustion gas that touches the side surface of the fuel cell stack.

2. The fuel cell module according to claim 1, wherein the fuel cell stack is a flat plate stack type fuel cell stack comprising the fuel cells of a flat type stacked in a vertical direction;
end plates configured to fix the fuel cells are provided at an upper end and a lower end of the fuel cell stack, respectively; and an upper combustion gas ejection port is provided at an upper position of the channel member and is configured to release the combustion gas toward an area above the fuel cell stack.

3. The fuel cell module according to claim 2, comprising a casing at least containing the fuel cell stack, the combustor, and the channel member, wherein the casing includes a hermetically closed upper end.

4. The fuel cell module according to claim 3, wherein the casing includes a combustion gas discharge port configured to discharge the combustion gas released from the channel member to outside of the casing; and the combustion gas discharge port is provided at a lower position of the casing.

5. The fuel cell module according to claim 3, wherein the casing comprises a plurality of panels;

among the plurality of panels, one panel includes an oxygen-containing gas intake port configured to take the oxygen-containing gas from outside to inside of the casing, and another panel positioned opposite to the one panel includes an oxygen-containing gas supply port configured to supply the oxygen-containing gas to the fuel cell stack; and an oxygen-containing gas supply channel is formed inside the plurality of panels, is configured to supply the oxygen-containing gas taken through the oxygen-containing gas intake port, from the oxygen-containing gas supply port to the fuel cell stack, and is configured to receive heat from the combustion gas to heat the oxygen-containing gas.

6. The fuel cell module according to claim 1, wherein a fuel exhaust gas and an oxygen-containing exhaust gas discharged from the fuel cell stack are supplied to the combustor.

7. The fuel cell module according to claim 1, wherein the combustor includes a combustion chamber, and both ends of the combustion chamber are opened; and the channel member includes a hollow rectangular first casing member connected to one end of the combustion chamber and extending upward along one side surface of the fuel cell stack, and a hollow rectangular second casing member connected to another end of the combustion chamber and extending upward along another side surface of the fuel cell stack.

8. The fuel cell module according to claim 1, wherein a reformer is provided at a bottom of the combustor and configured to reform a raw fuel chiefly containing hydrocarbon so as to produce the fuel gas supplied to the fuel cell stack.

9. The fuel cell module according to claim 1, wherein the combustion gas ejection hole faces the side surface of the fuel cell stack.

* * * * *